June 5, 1962  E. W. BRADMILLER ETAL  3,037,665
SHEET FEEDING APPARATUS
Filed April 3, 1958  4 Sheets-Sheet 1
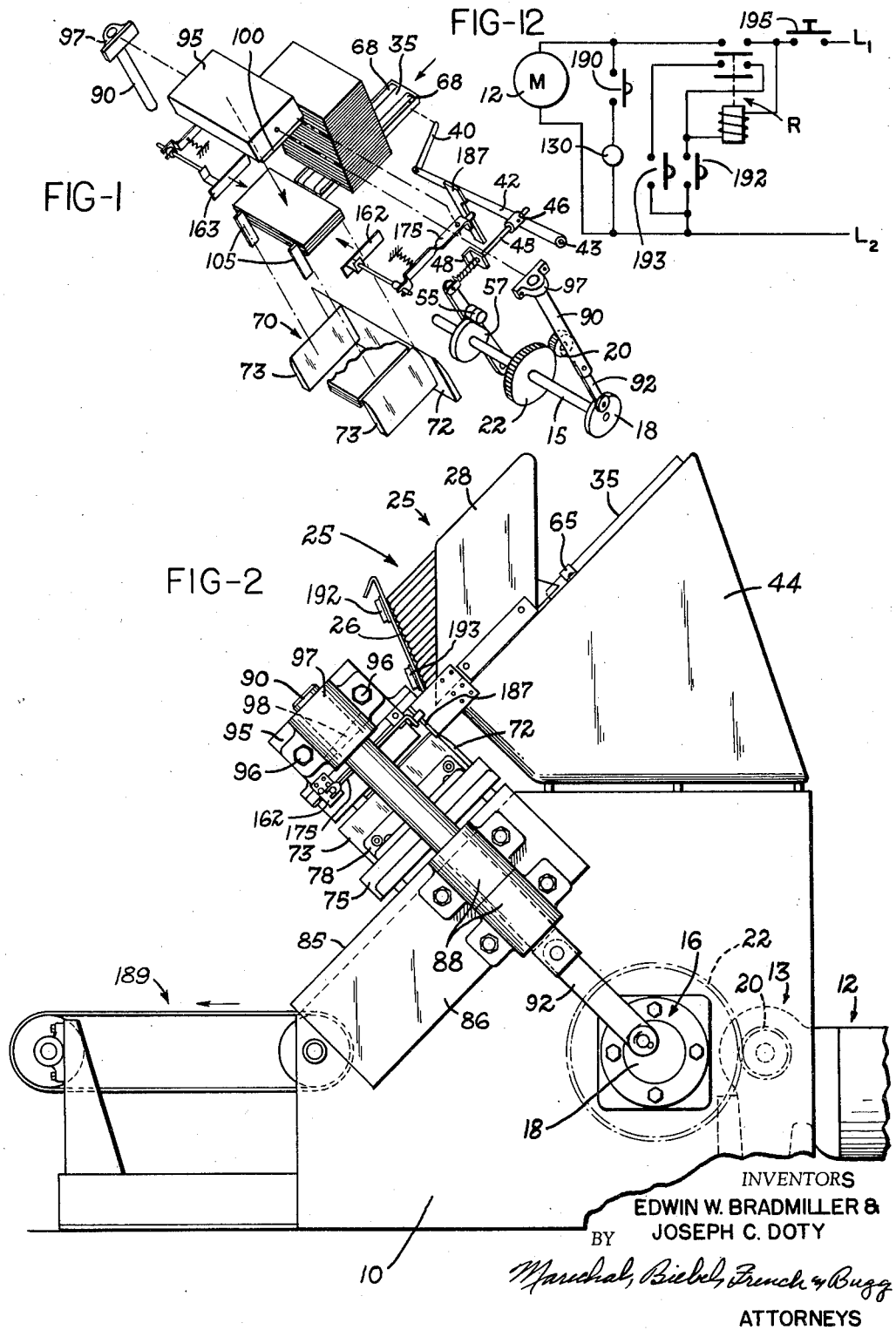
INVENTORS
EDWIN W. BRADMILLER &
JOSEPH C. DOTY
BY Marechal, Biebel, French & Bugg
ATTORNEYS

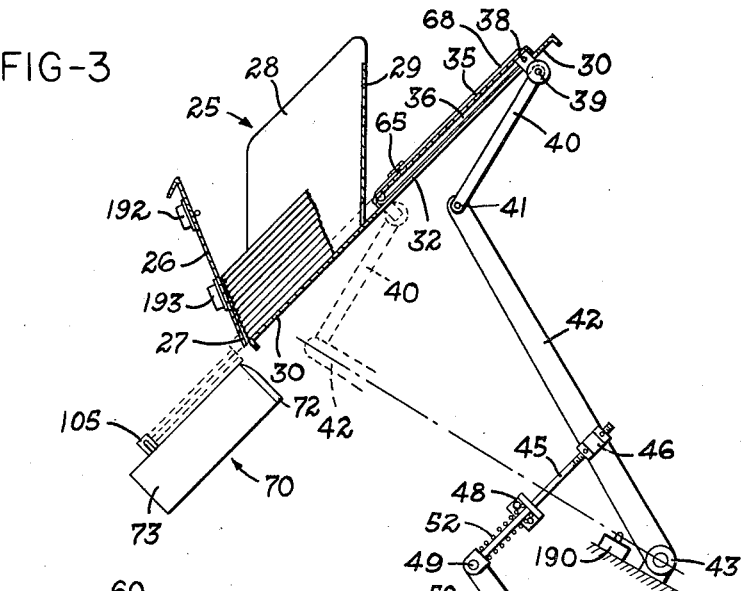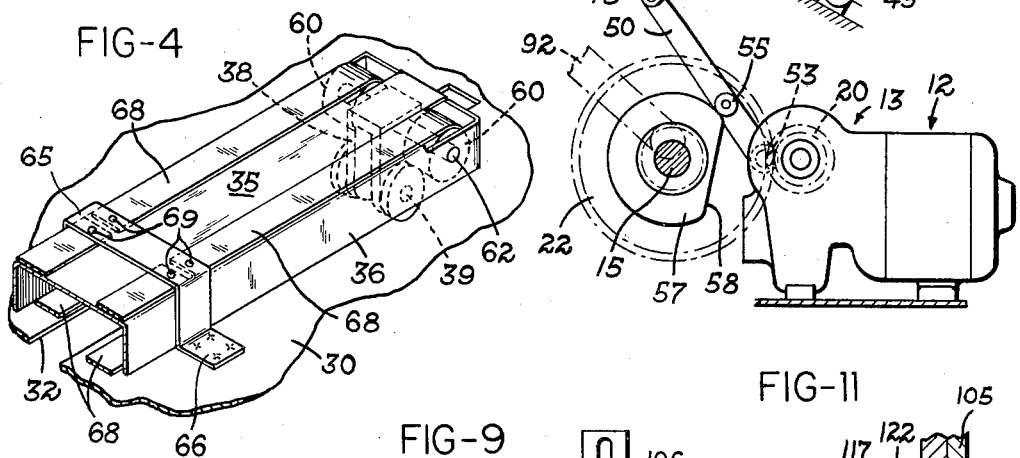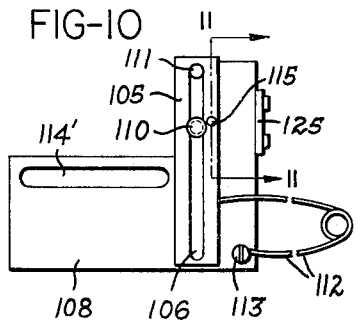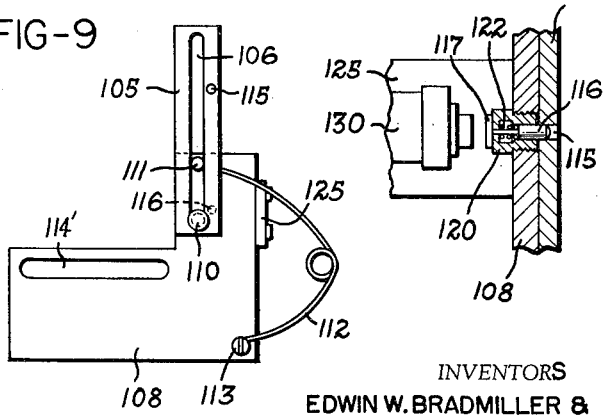

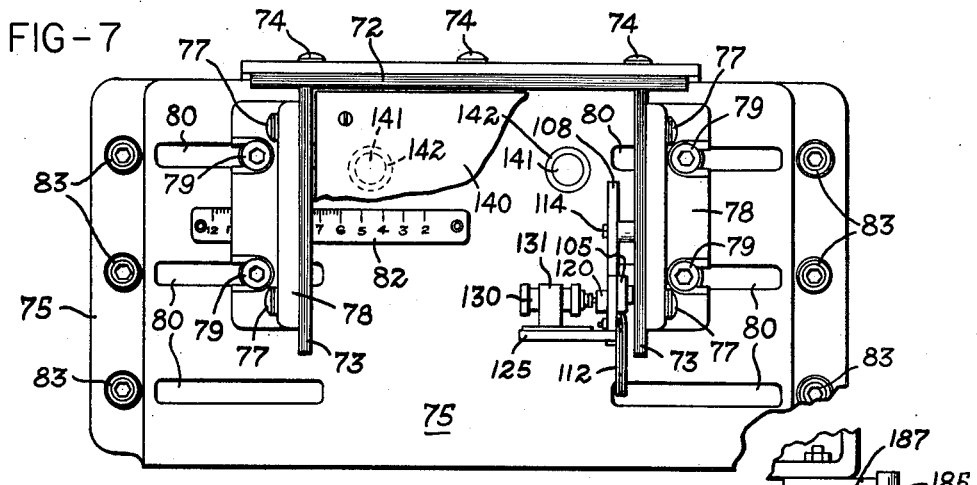
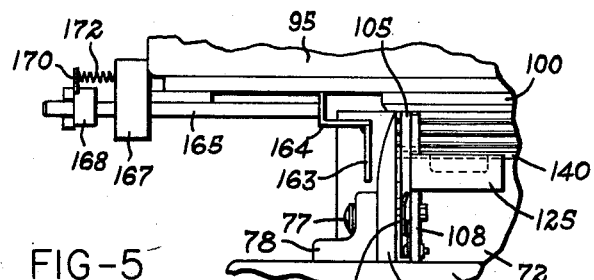
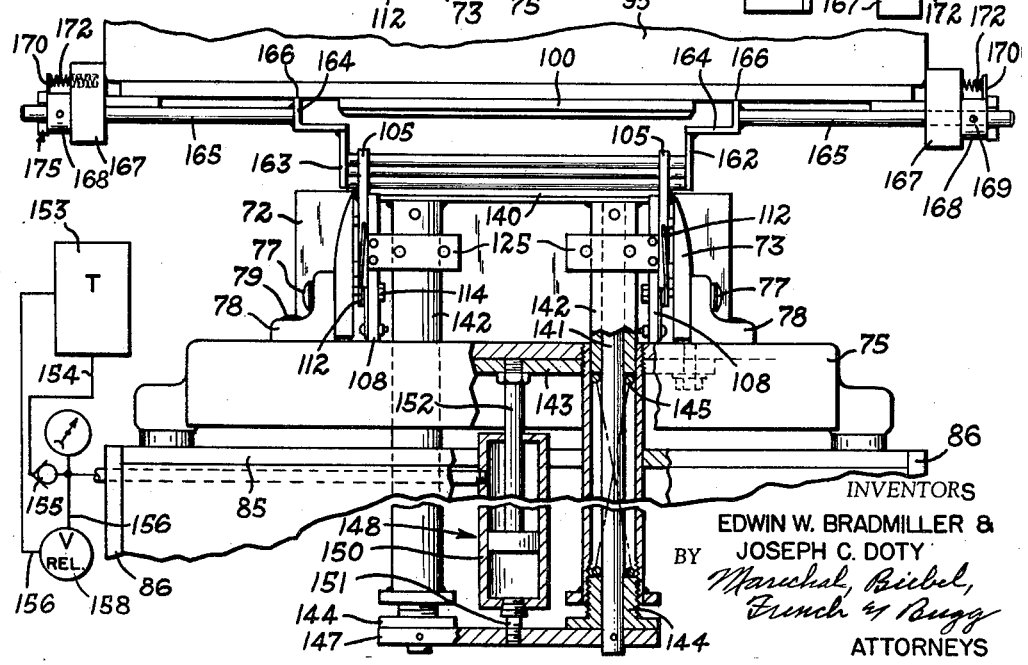

June 5, 1962  E. W. BRADMILLER ETAL  3,037,665
SHEET FEEDING APPARATUS
Filed April 3, 1958  4 Sheets-Sheet 4
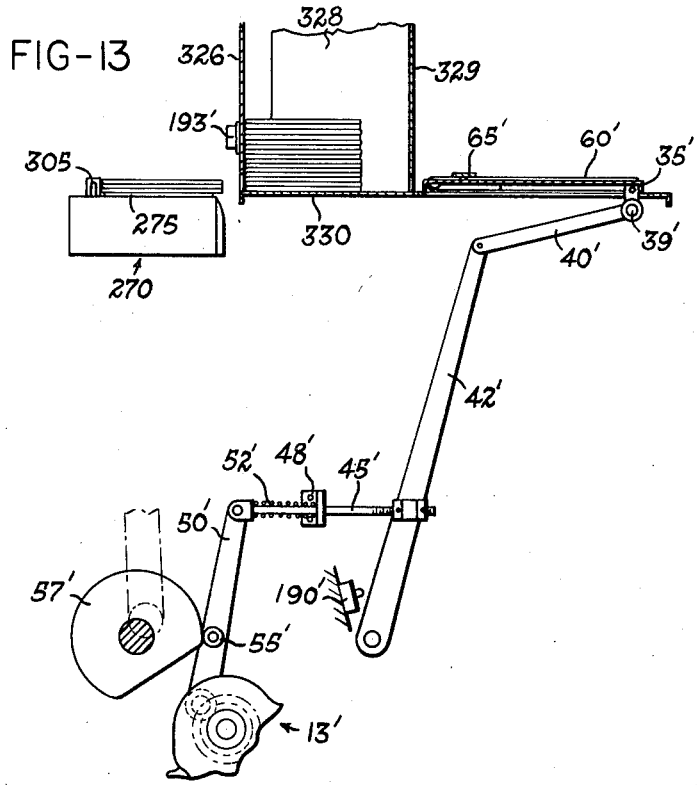
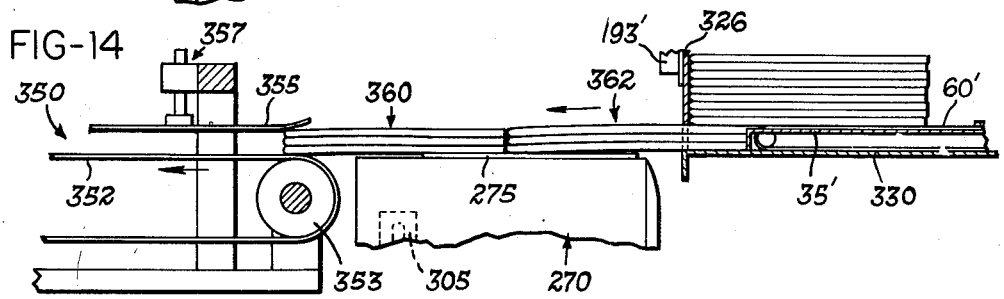
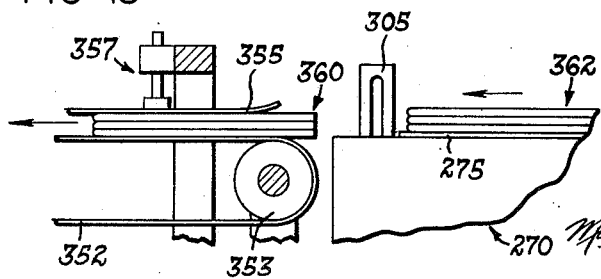
INVENTORS
EDWIN W. BRADMILLER &
BY JOSEPH C. DOTY
Marechal, Biebel, French & Bugg
ATTORNEYS United States Patent Office 3,037,665
Patented June 5, 1962

3,037,665
SHEET FEEDING APPARATUS
Edwin W. Bradmiller and Joseph C. Doty, Dayton, Ohio, assignors to Harris-Intertype Corporation, Cleveland, Ohio, a corporation of Delaware
Filed Apr. 3, 1958, Ser. No. 726,126
2 Claims. (Cl. 221—251)

This invention relates to trimming apparatus, particularly to machines for trimming bound books or other like materials simultaneously along a plurality of edges.

The primary object of this invention is to provide an improved and simplified relatively high speed machine for trimming bound books, magazines, or like material to final desired dimensions, wherein the trim cuts may be performed upon the material simultaneously along a plurality of edges thereof.

An additional object of the invention is to provide such a machine which operates on a continuous cycle such that the bound books or other material to be trimmed are fed into the machine and discharged therefrom at a relatively high rate.

A further object of this invention is to provide an improved machine for trimming bound books, magazines, or similar material, wherein the material to be trimmed is clamped between a ram member and a clamping plate and carried past a stationary trimming knife which is supported in position to effect the desired trim cut.

Another object of the invention is to provide for adjustable clamping pressure in such a trimming machine.

Another object of the invention is to provide in such a machine adjustments for varying the dimensions of the free edges of a bound book with respect to the bound edge thereof.

An additional object of the invention is to provide improved feed mechanism for feeding material in cyclic fashion from the bottom of a stack or pile of the material and for supporting the remainder of the stack upon stationary members during the feeding and retracting strokes of the feeder mechanism, thereby preventing disturbance of the pile or stack and clogging of the feed mechanism.

A further object of the invention is to include in such feed mechanism a control which will start the trimmer automatically when its supply magazine is filled with untrimmed material, and which will shut down the trimmer when the supply in the magazine has been lowered to a predetermined level.

Other objects and advantages of the invention will be apparent from the following description, the accompanying drawings and the appended claims.

In the drawings:

FIG. 1 is a schematic representation in exploded form of the various operating parts of a trimming machine in accordance with the invention;

FIG. 2 is a side plan view of the machine;

FIG. 3 is a side plan view of the feeder mechanism incorporated in the machine of FIG. 2, with the extreme operating positions thereof shown in full and dotted lines, respectively;

FIG. 4 is a perspective view showing a detail of the feed slide in the feeder mechanism of FIG. 2, with a portion of the slide in section;

FIG. 5 is an enlarged detail view looking from the lower left portion of FIG. 2 upwardly at the trimming knives and locating mechanism of the machine, and with certain parts broken away and shown in section;

FIG. 6 is a partial view similar to FIG. 5 showing the position of the parts as the operating ram reaches its lower dead center position;

FIG. 7 is a top plan view looking down upon the trimming knives shown in FIG. 6, with the major portion of the backup plate and one of the stop members removed for clarity of illustration;

FIG. 8 is a broken detail view of an enlarged scale of centering mechanism shown in FIGS. 2 and 5;

FIG. 9 is a detail view of one of the stop members in the normal position thereof as shown in FIG. 5;

FIG. 10 is a view similar to FIG. 9 showing the stop member in its retracted position as in FIG. 6;

FIG. 11 is a section taken on an enlarged scale along lines 11—11 of FIG. 10;

FIG. 12 is a wiring diagram;

FIG. 13 is a somewhat diagrammatic view of a modified form of apparatus;

FIG. 14 is a view similar to FIG. 13 showing the manner in which trimmed material is removed when the trimming knife is mounted in a generally horizontal plane; and FIG. 15 is a partial view similar to FIG. 14 showing a further progression in the discharging operation.

Referring to the drawings which illustrate preferred embodiments of the present invention, the trimming machine includes a base housing indicated generally at 10 (FIG. 2), and upon which a drive motor 12, having a conventional gear reduction head 13, is mounted. A drive shaft 15 (FIGS. 1 and 3) extends across housing 10 and is journaled at the opposite sides thereof in bearing 16, one of which is shown in FIG. 2. An eccentric 18 is secured to each end of drive shaft 15, and although only one of such eccentric is shown in the drawings it will be obvious that this construction is duplicated at the other side of the machine. The gear head 13 includes an output pinion 20 which meshes with the drive gear 22 secured to drive shaft 15, and thus during operation of the machine the shaft 15 is continuously rotated by motor 12.

The bound books, magazines, or other material to be trimmed are stacked within a supply magazine or storage chamber indicated generally at 25, and including a front wall 26 having a discharge or feed opening 27 in the lower edge thereof (FIG. 3), and opposite side walls 28 joined by an upper or back wall 29 which terminates short of the bottom edge of side walls 28. The supply magazine includes a bottom plate 30 which is sloped downwardly, as shown particularly in FIG. 3, so that the discharge or feed opening 27 is considerably below the back wall 29. Plate 30 extends upwardly and outwardly beyond the magazine rear wall 29 and is provided with a slot 32. A feed slide 35 is supported upon plate 30, with the downwardly turned sides 36 of the feed slide resting substantially at the surface of the plate 30. A drive lug 38 extends from the under surface of slide 35 through slot 32 to a pivotal connection 39 with a link 40. The other end of link 40 has a pivotal connection 41 with a feed drive arm 42, and this drive arm has a fixed pivotal mounting 43 at its other or lower end. This feed slide driving structure is contained within a housing 44 (FIG. 2) which is in turn mounted upon the top of the main housing 10, and which forms a base for bottom plate 30 and the related supply magazine structure.

A drive rod 45 is secured to drive arm 42 through an adjustable pivotal connection 46, and the rod 45 extends through an aperture in a fixed bracket 48 to a pivot connection 49 at its other end with a further drive arm 50. The bracket 48 may be fixed at any convenient point to a wall within the housing, and between it and the pivot connection 49 there is a spring 52 which tends normally to bias the drive arm 50 in a counterclockwise direction about its fixed pivotal mounting 53, thereby at the same time biasing arm 42 in a counterclockwise direction. A roller follower 55 is mounted upon drive arm 50 and contacts the surface of a cam 57 which is mounted on and rotates with the drive shaft 15. It will be obvious from an inspection of the drawings that during each revolution of shaft 15 the flat 58 on cam 57 passes follower 55 and at this time spring 52 urges arm 42 in a counterclockwise direction, pulling the feed slide 35 in a downward or feeding direction across the bottom of magazine 25, pushing or thrusting one or more of the bound books or other material from the bottom of the stack in the magazine outwardly and downwardly through the feed opening 27.

Referring particularly to FIG. 4, the feed slide is provided at its opposite ends with rollers 60 mounted upon a cross shaft 62. It will be understood that the roller structure shown in FIG. 4 is duplicated at the lower end of the feed slide. A generally U-shaped strap 65 is secured at its opposite ends 66 to the surface of bottom plate 30, at a position above and outside the magazine as shown in FIG. 3, and to this strap are secured the opposite ends of two flexible belts 68, being secured to the top cross piece of strap 65 by suitable rivets 69 or by any other suitable fashioning. These belts 68 extending over a majority of the upper surface of feed slide 35 and around the rollers 60 at opposite ends thereof. Therefore, as the feed slide moves with respect to the fixed strap 65 the belts 68 pass over the roller 60 so that more or less of the length of the belt extends on one or the other side of strap 65, depending upon the direction of motion of the feed slide.

It will be noted, however, that the surface of belts 68 themselves is stationary, being fixed to strap 65, and therefore as the feed slide engages the bottom part of the stack of books or other material in the magazine and pushes that part of the material through feed opening 27, the stationary upper surfaces of belts 68 engage the material immediately above the moving feed slide and provide a stationary supporting means for the remainder of the stack, thereby preventing disturbance of the stack of material with possible consequent jamming and clogging of the feed mechanism. The movement of the feed mechanism through one complete stroke is illustrated in FIG. 3, wherein this mechanism is shown in fully retracted position in full lines, and in its full forward or feed position in dotted lines.

The books are stacked within the magazine 25 with the bound edge resting against the front wall 26, and thus as the books to be trimmed are pushed from the bottom of the pile downwardly to the dotted position shown in FIG. 3, the bound edge is the leading or lower edge. The generally U-shaped trimming knife 70 is located at this point beneath the books to be trimmed. This knife may be provided as a single piece or integral element, but experience has shown that a three element adjustable knife may be more versatile in application. Such a knife, therefore, is shown as including the front knife blade 72 having its cutting edge uppermost and side knife blades 73 extending at right angles from front blade 72 with their respective cutting edges aligned with the cutting edge of blade 72. These cutting edges together define a cutting plane which is generally parallel to the plane of the magazine bottom plate 30, as shown in FIG. 3.

Referring to FIG. 7, the front knife 72 is secured by bolts 74 to one edge of a supporting base plate 75, while the side knives 73 are secured by bolts 77 to angle mounts 78. These mounts are in turn secured by bolts 79 extending through elongated slots 80 in base plate 75 to provide for lateral adjustment of the side knives 73 with respect to each other. As shown in FIG. 7, there are additional slots 80 provided to accommodate longer angle mounts if a longer side knife is needed in a particular job. Furthermore, a suitable scale 82 may be affixed to the base plate 75 providing for visual adjustment of at least one of the side knives with respect to a predetermined position on the base plate. The trimming knife structure 70 is supported in stationary position by bolting the base plate 75, through suitable connecting bolts 83, to the mounting plate 85 which extends across one corner of the main housing 10, as shown in FIG. 2, to provide the sloped or angled mounting of the trimming knife.

The side plates 86 at opposite sides of plate 85 each provide a mounting for a pair of guide bearings 88 which are bolted thereto, and through which extend the pull rods 90. These rods are in turn attached through connecting rods 92 to the eccentrics 18, so the pull rods 90 reciprocate in their bearings 88 once for each revolution of shaft 15. Between the upper ends of pull rods 90 there is mounted a ram plate or block 95 which is connected through bolts 96 to pillow blocks 97 which are in turn secured to the pull rods by taper pins 98. The ram block 95 and pull rods 90 thus provide a drive ram having a stroke such that the untrimmed books fed over the trimming knife 70 are forced through the knife and thus trimmed to desired dimensions. Preferably the lower surface of ram block 95 carries a cutting plate 100 of wood, fibre board, or similar material which is arranged to meet the cutting edge of the knife at the lower dead center position of the ram, thereby providing a clean cut through the last sheet of the book or other material being trimmed.

In order to position the books with reference particuarly to the front knife 72 a plurality of retractable stop members 105 are supported at the open edge of the trimming knife structure to engage the bound edges of the books as they are fed from the magazine. Since each of these stop members is of the same construction only one is shown and described in detail but it will be apparent that the other is constructed and operates in the same fashion. Thus, referring to FIGS. 5, 7, and 9–11, the stop members 105 are substantially rectangular bars provided with an elongated slot 106, and they are mounted upon L-shaped supports 108 by means of a bolt 110 extending freely through slot 106 and a guide pin 111 which also extends through the slot and serves to define the vertical movement of the stop member 105 with respect to mount 108. A spring 112 is connected between stop 105 and a mounting screw 113 on the mount 108, normally biasing the stop member 105 to its upper position shown in FIG. 9 and FIG. 5. In this position the stop members extend across the plane defined by the cutting edge of knife 70, and thus these stop members engage the bound edges of the books as they are fed into trimming position.

Each of the mounts 108 rests at its lower edge upon the base plate 75 and is adjustably secured to the face of an associated side trimming knife 73 by a bolt 114 which extends through an elongated slot 114′ in the mount, and with a suitable spacer serving to separate the mount 108 from the knife 73. Therefore, the spacial relation between the stop members 105 and the front knife 72 may be adjusted by moving the mounts 108.

Referring to FIG. 11, each of the stop members 105 is provided with a controllable detent for retaining it in the lower position shown in FIG. 10 against the bias of spring 112. Each of the stop members 105 is provided with a detent hole 115, and a detent pin 116 having a head 117 is carried within a hollow plug 120 which is threaded or otherwise secured into each mount 108. A spring 122 serves to urge the detent pin 116 to its normal extended or locking position shown in FIG. 11. The relative positions of the pin 116 and hole 115 are shown in FIG. 9, and thus when the stop member 105 is pushed downwardly against spring 112 to the retracted position shown in FIG. 10, pin 116 will enter the detent hole 115 in stop member 105 under the bias of spring 122, and the stop member 105 will be locked in this lowered position.

A suitable bracket plate 125 is secured to each of the mounts 108 and upon this plate there is supported a solenoid 130, held in position by a suitable hold clamp 131. The pin 116, or at least the head 117 thereof, serves as a moveable armature of solenoid 130, and if the solenoid is energized when the parts are in locked position as shown in FIG. 11, pin 116 will be withdrawn and stop 105 will immediately raise to its normal position under the influence of spring 112. The solenoid 130 need be energized, then, only long enough to unlock the detent and the parts will remain in unlocked position until the stop member 105 is again lowered.

Referring to FIGS. 5 and 6, the upper edges of stop members 105 are located beneath the ram plate 95, and thus as the ram descends to force the untrimmed books through the trimming knife, it also moves the stop members 105 to their lower position, as shown in FIG. 6, and then the detent mechanism will retain the stop members in this lowered position until solenoids 130 are energized to release the detents.

Referring to FIGS. 5 and 7, a suitable backup or pressure clamp plate 140 extends across the area within trimming knife 70, and this plate is mounted upon a plurality of studs 141 which are secured to the under surface of plate 140 and which extend through suitable bearing supports 142 secured to the bottom of base plate 75 through a suitable mounting plate 143. Adjustable stop nuts 144 are threaded to the lower ends of bearing supports 142, and return biasing springs 145 extend between stop nuts 144 and pressure plate 140, urging the plate to its upper position shown in FIG. 5, wherein its upper surface is substantially coplanar with the cutting edges of trimming knife 70, defining therewith a receiving surface for untrimmed material.

The lower ends of studs 141 are connected to a cross member 147, and a hydraulic pressure device in the form of a piston cylinder motor indicated generally at 148, is connected between the auxiliary or mounting plate 143 and cross member 147. The cylinder 150 is secured to cross member 147 by a connecting link 151, and piston 152 is connected to mounting plate 143.

Hydraulic fluid is supplied from a storage tank 153 through supply line 154 and check valve 155 to cylinder 150 above the piston. The check valve is so arranged that flow through supply line 154 can proceed only from the tank to the cylinder. A branch or return line 156 is connected to bypass check valve 155, and includes in circuit a conventional adjustable relief valve 158 which can be controlled in any suitable way to regulate the flow of hydraulic fluid from motor 148 as the piston and cylinder are moved in an extending direction, reducing the volume of the motor chamber connected to line 154. Such control will thus provide an adjustment for regulating the resistance applied by clamping plate 140 to correspond to different cutting requirements.

The clamping plate 140 thus is biased to its upper position as determined by stop nuts 144. The books are fed to the top or cutting edge of the trimming knife, as previously explained and shown in FIG. 3, and in this position the books rest upon clamping plate 140. As the ram descends the untrimmed books are effectively clamped between cutting plate 100 on the lower surface of the ram and clamping plate 140, and the books are then forced through the trimming knife while so clamped, against the biasing force exerted upon the clamping plate 140 by the resistance to flow of fluid from motor 148 through the relief valve 158, plus some resistance by springs 145. At the same time the stop members 105 are carried downwardly with the ram to their lower position and the detents operate to lock stop members 105 temporarily.

As the ram passes lower dead center and begins its up stroke, the springs 145 urge the clamping plate 140 upward, tending to collapse the piston-cylinder motor 148, and fluid is drawn back into the cylinder 150 from tank 153 through check valve 155. The springs return clamp plate 140 to its normal upper position, carrying the trimmed books upward beyond the stop members 105 which are at this time locked in their lowered position. The trimmed books are no longer retained against the force of gravity and due to the sloped mounting of the entire trimming mechanism the books slide off the clamping plate 140 and fall onto a suitable collector, shown diagrammatically in FIG. 2 as a conveyor which is indicated by the general reference character 160.

Although the stop members 105 provide for alignment of the untrimmed books with respect to the front trimming knife 72, they have no effect upon the lateral alignment of the untrimmed books, and it is desirable to provide suitable mechanism for this purpose. In accordance with the invention this alignment is provided by side jogging plates 162 and 163 (FIG. 5) which are each mounted in substantially the same manner. Accordingly, only one of the mountings will be described in detail, it being understood that substantially the same structure is used for both jogging plates. The plates 162 and 163 are secured to the lower edge of L-shaped brackets 164 which are in turn secured to the ends of rods 165. The upper edge 166 of bracket 164 preferably rests against, or substantially near the undersurface of ram plate 95, thereby preventing excessive turning of the rods 165 and maintaining the jogging plates in alignment. The rod 165 extends through a slide bearing mount 167 which is secured to the lower side of ram plate 95, and a stop collar 168 is adjustably fixed to rod 165 on the outer side of bearing mount 167 by a suitable set screw 169. An ear 170 extends upwardly from collar 168, and a spring 172 is positioned between the ear and bearing mount 167, normally biasing the collar 168 away from mount 167.

A jogger arm 175 extends along each side of ram plate 95, and is pivotally mounted thereon by means of a pivot block 176 and a stationary block 177 which is secured to ram plate 95. A bolt 180 extends through stationary block 177 and is threaded into pivot block 176, and the spring 182 extends between the bolt head and the adjacent surface of block 177, normally holding the blocks 176 and 177 in contact. This structure provides a release at the pivot point in the case of jamming, as will be described in further detail.

The end of arm 175 adjacent block 176 carries a roller follower 185 which cooperates with a stationary cam plate 187 mounted upon the forward end of the magazine 25. The other end 188 of arm 175 is bifurcated and extends around the end of rod 165, pressing against the outer side of collar 168. The arrangement is such that when follower 185 passes onto the high spot of cam plate 187 the bifurcated end 188 presses inwardly against the bias of spring 172 and causes the associated jogger plate to engage the edges of the untrimmed books. It will be noted that the jogger plates are urged to this center position only when the ram is in the upper portion of its cycle, and that as the ram moves downwardly the follower 185 passes to the lower portion of cam 187 with resultant outward biasing of the jogger plates by springs 172.

The only difference between the mechanism and mounting for the plate 162 and plate 163 is that the pivot block corresponding to block 176 on the other side may be secured directly to ram plate 95 and need not incorporate the release feature shown in FIG. 8, although this feature can, if desired, be used on both jogger mechanisms. The purpose of this mechanism is to permit arm 175 to swing outwardly about its bifurcated end as a pivot point if the untrimmed material jams over the trimming knife and prevents the inward movement of jogger plate 162 to its predetermined position. Otherwise, it is possible that such jamming might result in breaking or bending of arm 175 since the follower 185 will follow cam plate 187 whenever the ram is moving.

Adjustment of the jogger plates is provided by the adjustable connection between collars 168 and rods 165. Thus, by locating the rods 165 at a selected position the final centering of the untrimmed books with respect to side trim knives 73 may be effected as the ram passes over its top dead centering position, and as the ram moves downwardly the jogger arms swing outwardly to pass beyond the outer sides of the side knives 73, avoiding any interference between the jogger mechanism and the trimming knife.

The operation of the trimming machine is cyclic and continuous, with the ram mechanism reciprocating toward and away from trimming knife 70. The operation of the feed slide preferably is initiated before the ram reaches top dead center, for example in a position where the eccentric is approximately 30° before top dead center, as shown schematically in FIG. 3. At this time the jogger plates 162 and 163 are progressing inwardly to their positioning locations, and in the configuration shown the feed slide reaches its forward feed position when the ram has progressed to a point where the eccentric is approximately 15° past dead center. The feed slide then retracts during the next 45° so that it is fully withdrawn before the ram is much beyond halfway in its downward stroke.

As the ram forces the untrimmed books through the tirmming knife the clamping plate 140 is depressed, as described, and the stop members 105 move to their retracted position and lock. Then as the ram moves in its upward stroke the backup plate 140 follows until it reaches the level of the cuting edge of the trimming knife, where all of the trimmed books may slide off the backup plate onto conveyor 189. The stop members remain locked in their retracted position until the ram reaches the point where the flat surface of cam 57 again passes follower 55 and the feed mechanism is actuated. Then, as the feed slide progresses downwardly drive arm 42 engages a switch 190 (FIG. 3) which causes energization of solenoid 130 and withdrawal of detent pins 116. Springs 112 then immediately force stop members 105 back to their normal raised position before the feed stroke is completed, so that the stop members are up in their locating position by the time the untrimmed books have been thrust over the trimming knife, and they serve again to locate the untrimmed books with respect to the front knife 72. The cycle then continues in this fashion.

Referring to FIGS. 2 and 12, assuming that the motor 12 is adapted for connection to a suitable power supply L1, L2, the machine may be started by placing a stack of untrimmed books or other untrimmed material in magazine 25, the stack being sufficiently high to close an upper or starting switch 192 which causes energization of relay R to start motor 12 and initiate operation of the machine as described above. This also completes a holding circuit which bypasses switch 192, but when the stack of untrimmed books in the magazine is reduced below the level of a lower stop switch 193, this switch will open to break the holding circuit and cause relay R to open, cutting off the power supply to motor 12. The machine will then stop until the magazine is again filled. A suitable manual start and stop switch 195 may be provided to control the power supply to the machine.

FIGS. 13–15 illustrate a modified form of the apparatus wherein the trimming knife 270 is mounted with the cutting edge thereof in a generally horizontal plane, and with the clamping plate 275 operating in the same manner as clamping or pressure plate 140 previously described. The retractable stops 305 are of the same construction as stops 105, and the magazine structure for untrimmed books or magazines includes a vertical front plate 326 and cooperating side plate 328 and rear wall 329.

The bottom 330 of the magazine is spaced slightly above the level of clamping or pressure plate 275 when the latter is in its normal or raised position, so that untrimmed material fed through the opening 327 at the lower end of front wall 326 will pass onto the surface of plate 275. The remainder of the feeder structure is of the same construction as described previously, and as shown particularly in FIG. 3. Accordingly, the same reference numerals with a prime added have been used to designate this structure, and a detailed explanation of its operation is unnecessary, since the operation is the same as previously described in connection with FIGS. 1 and 3.

At the discharge side of trimming knife 270 there is mounted a suitable conveyor designated by the general reference numeral 350, and including a conveying belt 352 which preferably is continuously moving in the direction of the arrow in FIG. 14. The belt passes over a guiding roller 353 which is positioned adjacent the discharge side of knife 270 and which directs the upper flight of conveyor belt 352 to a level slightly below the level of plate 275 when that plate is in its normal position. A suitable guide member 355 having an upturned leading edge is supported through an adjustable mounting indicated generally at 357 for directing the trimmed books or magazines 360 onto conveyor belt 352.

The movement of conveyor 350 is so correlated to the speed of operation of the feeder mechanism that trimmed books or magazines engaged with the conveyor will move at a rate greater than the untrimmed books 362 being fed into trimming position by the feeder slide 35'. Thus, the operation of this modified form of apparatus is generally the same as that shown and described in connection with FIG. 3, except for the manner in which the trimmed books or magazines 360 are discharged from the machine. It will be understood that when untrimmed books are forced through the trimming knife by the driving ram, they are then returned to a level above the cutting edge of the trimming knife by pressure plate 275. At the same time the stops 305 have been moved to, and locked in, their lower position such that the trimmed books may be discharged over these stop members. The feed slide 35' then moves forward to engage a number of untrimmed books 362 from the bottom of the stack in the magazine, and these untrimmed books are thrust forward over pressure plate 275 to engage the trimmed books 360 and urge them in the direction of conveyor 350.

Once the trimmed books engage belt 352 they are accelerated sufficiently to pull them away from engagement with the untrimmed books 362 and a space or gap opens between them through which the stop members 305, which are released during the feed stroke, may project to engage and position the oncoming untrimmed books or magazines 362, as shown in FIG. 15. In other respects, the operation of this modified form of apparatus is the same as the principal form described previously.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. Apparatus for feeding a quantity of sheet material or the like from the bottom of a stack of such material, comprising a plurality of side walls defining a feed magazine, a bottom plate on said magazine, one of said walls having at least a portion of the lower edge thereof spaced from said bottom plate to define a feed opening, a feed slide mounted for reciprocating movement across said bottom plate toward and away from said feed opening, said slide having a forward edge of predetermined thickness adapted to engage a predetermined portion of material at the bottom of the stack, flexible strap means passing around said slide in the direction of motion thereof and behind said forward edge of said slide, and means anchoring a portion of said strap means to said plate above said slide on the opposite side of said magazine from said feed opening to hold said strap means against sliding movement with respect to the material stacked in said magazine as said slide pushes material from the bottom of the stack through said feed opening, said strap means providing a support for the stack of material in which there is no relative movement between the stack of material and said strap means.

2. Apparatus as defined in claim 1 in which said walls of said magazine and said bottom plate are mounted to form an angularly arranged stack of material therein with said feed opening at the lowermost edge of said magazine, and drive means for said feed slide connected to reciprocate said slide over the surface of said bottom plate along a path in which the lower leading edge of said slide moves from a withdrawn position upward and beyond the stack to a position adjacent said feed opening and then returns to the said withdrawn position permitting the stack to descend and the lowermost material in said stack to drop onto said bottom plate for subsequent discharge through said feed opening.

References Cited in the file of this patent
UNITED STATES PATENTS

| Number | Name | Date |
|---|---|---|
| 267,574 | Mundell | Nov. 14, 1882 |
| 426,685 | Safford | Apr. 29, 1890 |
| 490,877 | Lovell | Jan. 31, 1893 |
| 972,649 | Rose | Oct. 11, 1910 |
| 1,801,165 | Macke | Apr. 14, 1931 |
| 1,888,746 | Specht | Nov. 22, 1932 |
| 2,073,320 | Smith | Mar. 9, 1937 |
| 2,458,612 | Luzzatto | Jan. 11, 1949 |
| 2,571,976 | Ward | Oct. 16, 1951 |
| 2,609,779 | Goldsworthy | Sept. 9, 1952 |
| 2,681,461 | Trimble | June 22, 1954 |
| 2,751,003 | Mueller | June 19, 1956 |